United States Patent [19]

Younes

[11] Patent Number: 4,731,427

[45] Date of Patent: Mar. 15, 1988

[54] METHOD FOR THE PREPARATION OF RIGID REACTION INJECTION MOLDED THERMOSET POLYURETHANE MODIFIED POLYISOCYANURATE COMPOSITIONS

[75] Inventor: Usama E. Younes, Newtown Square, Pa.

[73] Assignee: Arco Chemical Company, Newtown Square, Pa.

[21] Appl. No.: 32,801

[22] Filed: Apr. 1, 1987

[51] Int. Cl.$^4$ ............................................. C08G 18/20
[52] U.S. Cl. ................................... 528/53; 264/328.1; 264/328.6; 264/328.8; 264/331.12
[58] Field of Search .............................. 528/53, 54, 73; 264/328.1, 328.6, 328.8, 331.12

[56] References Cited

U.S. PATENT DOCUMENTS 3,703,520 11/1972 Carleton et al. ........................ 528/52

Primary Examiner—Maurice J. Welsh
Attorney, Agent, or Firm—Delbert E. McCaslin

[57] ABSTRACT

A method for the preparation of a molded reaction injection molded rigid polyurethane modified polyisocyanurate polymer composition by injecting at least two streams into the mold cavity of a RIM machine to react at temperatures of from about ambient to about 140° C. a reaction mixture comprising at least one stream of an organic di- or polyisocyanate and a second stream of a cyclic alkylene carbonate, a polyether polyol and a soluble adduct of a tertiary amine and a cyclic alkylene carbonate as catalyst.

12 Claims, No Drawings ic catalysts.
METHOD FOR THE PREPARATION OF RIGID REACTION INJECTION MOLDED THERMOSET POLYURETHANE MODIFIED POLYISOCYANURATE COMPOSITIONS

FIELD OF THE INVENTION

This invention relates to a method for the preparation of rigid reaction injection molded polyurethane modified polyisocyanurate thermoset polymer compositions by injecting at least two streams into a cavity of a reaction injection molding (RIM) machine.

BACKGROUND OF THE INVENTION

The preparation of reaction injection molded elastomers such as polyurethane foamed products with release agents is known and has become popular for the preparation of automobile body parts and other applications (See U.S. Pat. No. 4,420,570). Generally the commercial RIM machines are of the two stream variety to prepare the foamed products, however three, four or more may be employed.

The preparation of polyisocyanurate foams using a wide variety of trimerization catalysts has been suggested and used (see for example U.S. Pat. No. 4,033,908 and references cited therein).

U.S. Pat. Nos. 3,878,156. 3,883,466 and 3,886,102 all describe the preparation of rigid non-cellular polyurethane compositions from polyether polyols, isocyanates, organic carbonates and non-amine containing metallic catalysts.

U.S. Pat. No. 4,035,331 discloses a rigid non-cellular polyurethane composition using an amine initiated polyol an isocyanate and a liquid modifier of an organic carbonate.

U.S. Pat. No. 3,703,520 describes the preparation of an insoluble trimerization adduct catalyst of ethylene carbonate and triethylene diamine.

SUMMARY OF THE INVENTION

According to the present invention there is provided an improved method of making a rigid RIM polyurethane modified polyisocyanurate thermoset polymer composition which comprises injecting at least two streams via a RIM machine into a mold cavity of desired configuration to react at temperatures of from about ambient to about 140° C. a reaction mixture comprising at least one stream of an organic di-or polyisocyanate and a second stream of from about 2 to about 50 parts by weight of a cyclic alkylene carbonate and from about 2 to about 50 parts by weight of a polyether polyol based on 100 parts of isocyanate-carbonate-polyol composition, and in the presence of a soluble adduct of a tertiary amine and a cyclic alkylene carbonate as catalyst at a concentration of from about 0.01 to about 5.0 weight percent based on the total composition. With the exception of that which may be in the adduct catalyst, cyclic alkylene carbonate may be injected along with di- or polyisocyanurate.

It is a primary object of this invention therefore, to provide an improved method for the preparation of a rigid polyurethane modified polyisocyanurate thermoset composition having improved properties via a reaction injection molding (RIM) machine.

It is another object of this invention to provide a polyurethane modified polyisocyanurate RIM composition which at 100° C. will provide 10 times the release from the mold than the regular prior art RIM urethanes using external mold release agent.

These and other objects and advantages of this invention will become apparent from the description of the invention and from the claims.

DETAILED DESCRIPTION OF THE INVENTION

In accordance with the present invention, rigid polyurethane modified polyisocyanurate thermoset polymer compositions are prepared by reaction injection molding (RIM) by injecting at least two streams into the mold cavity of a RIM machine of desired configuration to react at temperatures of from about ambient to about 140° C. a reaction mixture comprising at least one stream of an organic di- or polyisocyanate and a second stream of from about 2 to about 50 and preferably from about 10 to about 25 parts by weight of a cyclic alkylene carbonate and from about 2 to about 50 and preferably from about 10 to about 25 parts by weight, based on the isocyanate-carbonate-polyol composition, and a soluble adduct of a tertiary amine and a cyclic alkylene carbonate as catalyst at a concentration of from about 0.01 to about 5.0 and preferably from about 0.02 to about 0.2 weight percent based on the total composition. As indicated hereinabove some of the cyclic alkylene carbonate may be injected with the stream containing the di-or polyisocyanate.

A wide variety of organic isocyanates including aliphatic, alicyclic and aromatic polyisocyanates may be employed in the instant invention and are characterized by contaiing two or more isocyanate (NCO) groups per molecule. Typical organic di or polyisocyanates include p-phenylene diisocyanate, polymethylene polyphenyl isocyanate, toluene-2,4- and 2,6-diisocyanate or mixtures thereof, diansidine diisocyanate, hexamethylene diisocyanate, naphthalene-1,4-diisocyanate, naphthalene-1,4-diisocyanate, octylene-1,8-diisocyanate, 4,4'-diphenylpropane diisocyanate, 3,3'-dimethyl diphenylmethane-4,4'-diisocyanate, triphenylmethane triisocyanate,3,3'-ditolylene-4,4'-diisocyanate, 4-chloro-1,3-phenylene diisocyanate 1,4-,1,3-and 1,2-cyclohexylene diisocyanate and in general the isocyanates disclosed in U.S. Pat. No. 3,577,358. Mixtures of polyisocyanates may be used which for example are the crude mixtures of di- and higher functional polyisocyanates produced by phosgenation of aniline-formaldehyde condensates or as prepared by the thermal decomposition of the corresponding carbamates dissolved in a suitable solvent as described in U.S. Pat. Nos. 3,962,302 and 3,919,279, both known as crude MDI or PMDI. The organic polyisocyanates may be isocyanate-ended prepolymers made by reacting under standard known conditions, an excess of a polyisocyanate with a polyol which on a polyisocyanate to polyol basis may range from about 20:1 to 2:1 and include for example polyethylene glycol, polypropylene glycol, diethylene glycol monobutyl ether, ethylene glycol monoethyl ether, triethylene glycol, etc. as well as glycols or poly glycols partially esterfied with carboxylic acids including polyester polyols and polyether polyols. Known processes for the preparation of polyamines and corresponding methylene bridged polyphenyl polyisocyanates therefrom are disclosed in the literature and in many patents; for example U.S. Pat. Nos. 2,683,730, 2,950,263, 3,012,008, 3,334,162 and 3,362,979. The isocyanates may contain impurities or additives such as the carbodiimides or uretonimine modified MDI products. The preferred polyisocyanates are the diphenylmethane diisocyanate 2,4' isomers which may include the 2,2' isomer and the higher functional polyisocyanate polymethylene polyphenyl isocyanate mixtures, which may contain from about 20 to about 85 weight percent of the diphenylmethane diisocyanate isomers. In general the organic isocyanates will have a molecular weight in the range of between about 100 and about 10,000. Typical of the preferred polyisocyanates are those sold commercially as "Isonate 143-L" and "Isonate 181" by the Upjohn Company a carbodiimide modified diphenylmethane diisocyanates and an ethylene glycol capped isocyanate prepolymer having 22.9% NCO respectively, "Rubinate-M" (Rubicon Chemical Inc.) and similar diisocyanates. The amount of isocyanate employed in the RIM process will be from about 95 to about 50 and preferably from about 80 to about 65 parts by weight based on the isocyanate-alkylene carbonate-polyol ingredients in the reaction mixture.

The cyclic alkylene carbonates employed in the present invention in amounts of from about 2 to about 50 preferably from about 10 to about 25 parts by weight based on the isocyanate-carbonate-polyol composition have the general formula:

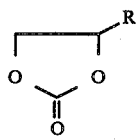

wherein R is hydrogen, $CH_3$, $C_2H_5$ or $C_3$ to $C_{10}$ hydrocarbons. Typical cyclic alkylene carbonates include, for example, ethylene carbonate, propylene carbonate, butylene carbonate styrene carbonate and octylene carbonate, mixtures thereof and the like. Liquid alkylene carbonates are preferred, however, solid or semi-solid carbonates may be used if liquified with other liquid alkylene carbonates or by the reaction temperature at which they are employed. Propylene carbonate is the preferred cyclic alkylene carbonate. Some of the alkylene carbonate may also be added, in the RIM injection process, along with and mixed with the isocyanate in order to reduce viscosity.

The polyether polyols or mixtures of polyether polyol are the polyoxyalkylene polyether polyols used in the present invention include those having from 2 to about 10 hydroxyl groups. Such polyether polyols and methods for their preparation are described in "Polyurethanes: Chemistry and Technology" by Saunders and Frisch, Interscience Publishers, 1964. Particularly suitable polyether polyols include those having molecular weights of from about 200 to about 10,000 or higher and preferably molecular weights of from about 2000 to about 8000 and prepared by reacting an initiator compound having 2 to about 8 hydroxyl groups with an alkylene oxide or mixtures of such oxides. Suitable initiator compounds include, for example, ethylene glycol, propylene glycol, water, dipropylene glycol, trimethylene glycol, 1,2-,1,3- and 1,4-butanediol, glycerol, 1,2,6-hexanetriol, trimethylolethane, trimethylolpropane, pentaerythritol, sorbitol, sucrose and the like. The alkylene oxides suitable for use include ethylene oxide, propylene oxide, 1,2- and 2,3-butylene oxide, styrene oxide, epichlorohydrin, epibromohydrin and mixtures thereof, etc. The polether polyols may be diols or triols, as well as capped diols or triols or mixtures thereof. Amine or hydroxyl terminated polybutadiene may also be employed. Chain extenders or mixtures thereof may also be employed along with the polyether polyols in the total formulation. Such chain extenders include mixtures of difunctional and trifunctional chain extenders. Typical known chain extenders which may be used include diols, amino alcohols and diamines or mixtures thereof.

The catalysts employed in the instant invention for formation of the polyurethane modified polyisocanurate polymer are trimerization catalysts and are soluble complex adducts of a reaction of a tertiary amine and cyclic alkylene carbonates as set forth hereinabove. The preferred catalyst is an adduct of triethylene diamine (DABCO) and propylene carbonate. In order for the catalysts of the instant invention to provide optimum RIM results i.e., catalyze the RIM reaction in 2 minutes or less, they should be essentially fully aged for periods of from about 1 hour to about 90 days which time period will be dependent on the given catalyst concentration and aging temperature. Aging at ambient temperatures may be employed and would generally be about 12 hours at, for example a concentration of about 0.5 weight percent. Lesser periods would be realized at higher temperatures e.g. about 40° C. to about 120° C. and/or at increased concentrations.

The tertiary amines which may be employed to form the complex adduct catalysts include, for example, N-methyl morpholine, N-ethyl morpholine, dimethylaminocyclohexane, triethylenediamine, bis(dimethylaminoethyl) ether, dimethylethanolamine, 1,4-dimethylpiperazine, trimethylaminopropylethanolamine, trimethylhydroxyethyl ethylenediamine N,N,N',N'-tetramethyl ethylene diamine and the like.

Although not essential to the practice of this invention, the use of commonly known additives which may enhance color or properties of the polyurethane modified polyisocyanurate polymer may be used if desired. For example, reinforcing materials which may be in a powder, granular or long fiber form such as chopped or milled glass fibers, chopped or milled carbon fibers, silicon fibers, synthetic fibers such as nylon or "Kevlar", polyethylene or polypropylene fibers or strands, natural fibers of wool or cotton, cellulolsic fibers, etc. may be used. Woven or non-woven mats of the fibers may be employed.

The polyurethane modified polyisocyanurate compositions of the present invention are essentially non-cellular. However, due to small amounts of water which may be present in the reaction components, i.e., polyisocyanates, polyols and and alkylene carbonate as well as the adduct catalyst, the composition may contain small or micro cells in the polymer.

Although excellent mold release is obtained with the RIM formulation of the instant invention alone, external or internal mold release agents such as for example, the dimethyl siloxanes with organic acid groups may be employed.

The present invention is more fully illustrated by the following examples, which include particular features of the invention. However, the examples are not to be construed as limiting the invention in any way, it being understood that numerous variations are possible without departing from the spirit and scope of the invention.

EXAMPLE 1

The follollowing formulation was reaction injection molded on a Martin Sweets "Flexamatic HP-206" RIM machine into an aluminum mold 8"×8"×⅛"

| Component A | Component B | |
|---|---|---|
| Carbodiimide Modified Diphenylmethane Diisocyanate ("Isonate-143L") | Propylene Carbonate | 49.87% |
| | Polyol ("Niax E351)* | 49.87% |
| | Triethylene Diamine (DABCO) | 0.5% |

*Polyol "Niax E351 is a polyether polyol sold by Union Carbide Corp. and is a capped diol comprising ethylene oxide adducts of polyoxypropylene diol containing primary hydroxyl groups.

Component B was allowed to stand (age) for a 24 hour period at room temperature to form an amine-carbonate adduct. 132.8 gms of Component A and 94.6 gms of Component B were impingement mixed into the aluminum mold. The material was demolded in about 1 minute. The formed polyurethane modified polyisocyanurate was then postcured for 2 hours at 120° C. Testing of the material with an "Instron" gave a tensile strength and Young's Modulus of 3890 psi and 123,270 psi respectively, as well as a flex strength and flex modulus of 5500 psi and 123,270 psi respectively, an Izod impact strength of 0.39 ft.lbs/in and a Shore D-Hardness of 70.

EXAMPLE 2

The procedure of Example 1 was repeated using the same amounts of the Component A and B compositions which was impingement mixed into the aluminum mold having a woven glass mat placed in it. The reaction polymer composition was demolded in about 1 minute and postcured for 2 hours at 120° C. Testing of the resulting molded polyurethane modified polyisocyanurate gave a tensile strength of 12,850 psi, Young's Modulus of 444,450 psi, flex strength of 8070 psi, flex modulus of 265,160 psi, a notched Izod impact strength of 18.1 ft.lbs/in. and a Shore D-Hardness of 78.

EXAMPLE 3

The following formulation was reaction injection molded on a Martin Sweets machine as in Example 1.

| Component A | Component B | |
|---|---|---|
| "Isonate 143L" 85% | Polyol ("Niax E-351") | 65.87% |
| Propylene Carbonate 15% | 1,4-Butanedial (chain extender) | 33.75% |
| | Triethylene diamine-propylene carbonate adduct | 0.36% |
| | Dibutyl tin dilaurate | 0.02% |

70 parts of Component A and 30 parts of Component B with a total formulation of 49.3% isocyanate, 30% polyol, 15.3% 1,4 butanediol and 6.2% propyene carbonate was impingement mixed into an aluminum mold. The material was demolded in about 1 minute. The formed polyurethane modified polyurethane was then postcured for 2 hours at 120° C. Testing of the polymer with an "Instron" gave a tensile strength of 3485 psi, Young's Modulus of 62,019 psi, flex strength of 4196 psi and flex modulus of 105,690 psi and % elongation of 44.0%.

EXAMPLE 4

Preparation of the soluble tertiary amine-propylene carbonate adduct trimerization catalyst as used in the instant invention 5.5 gm of triethylene diamine (DABCO) was dissolved in 558.4 gm of propylene carbonate ("ARCONATE" 5000 sold by ARCO Chemical division of Atlantic Richfield Co.) and the solution allowed to stand at room temperature for approximately 500 hours (to form the adduct and age the mixture), at which time a dark brown catalyst solution was obtained. The activity of the catalyst as a function of aging was demonstrated by measuring the set time at ambient temperature of 25° C. of a 70:30 parts by weight mixture of MDI ("Isonate 143 L") and 0.1% of the catalyst solution in propylene carbonate.

| Catalyst Age (hrs.) | Set Time (minutes) |
|---|---|
| 0 | No set time for 2,000 hrs. |
| 21.5 | 1500 |
| 45.5 | 900 |
| 69.5 | 240 |
| 94.5 | 13.6 |
| 190.5 | 6.0 |
| 220.5 | 4.5 |
| 268.5 | 3.3 |
| 335.5 | 3.2 |
| 507.5 | 2.0 |
| 671.5 | 1.5 |

EXAMPLE 5

A 5% solution of N,N,N', N'-tetramethyl ethylene diamine in propylene carbonate was prepared and the solution allowed to age at 60° C. for 21 hours, at which time a darkening of the solution was observed indicating formation of the active catalyst adduct.

This catalyst solution was compared to a freshly prepared N,N,N',N'-tetramethyl ethylene diamine with no aging in a RIM formulation, following the procedure of Example 1, with 70% MDI ("Isonate 143L"). 10% polyether polyol ("Niax E351"), 10% propylene carbonate, and 10% of the 5% catalyst adduct solution (concentration 0.5% of total composition). The reactivity results showed no set time for the fresh non-aged solution and a set time of 0.95 minutes for the 21 hour aged catalyst solution.

EXAMPLES 6-9

The following reaction mixtures were impingement mixed into a Martin Sheets RIM machine as in Example 1. Component A was "Isonate 181" of Union Carbide Corp. Test results are given in the folowing Table. Examples 7 and 8 contained non-woven glass mats to give 40% by weight glass in the molded polymer.

| | Component A Wt % Isocyanate | Component B | | |
|---|---|---|---|---|
| | | Propylene Carbonate Wt. % | Polyol Wt. % | Propylene Carbonate Adduct Wt % |
| Ex. 6 | 78.4 | 10.64 | 10.80 | .16 |
| Ex. 7 | 78.1 | 10.79 | 10.95 | .16 |
| Ex. 8 | 63.6 | 18.04 | 18.20 | .16 |
| Ex. 9 | 64.4 | 17.64 | 17.80 | .16 |

TABLE

|  | Tensile Strength (psi) | Tensile Modulus (psi) | % Elongation | Flex Strength (psi) | Flex Modulus (psi) | Izod ft-lb/in | Shore D Hardness |
|---|---|---|---|---|---|---|---|
| Example 6 | 8273 | 201300 | 7.2 | 9557 | 210750 | 0.69 | 79.0 |
| Example 7 | 13711 | 448680 | 8.0 | 21000 | 446880 | 13.60 | 78.0 |
| Example 8 | 13259 | 331030 | 10.9 | 8658 | 243660 | 14.60 | 75.0 |
| Example 9 | 5726 | 123000 | 11.0 | 6987 | 167490 | 0.59 | 78.0 |

I claim:

1. A method for the preparation of rigid reaction injection molded polyurethane modified polyisocyanurate thermoset polymer composition which comprises injecting at least two streams via a RIM machine into a mold cavity of the desired configuration to react at temperatures of from about ambient to about 140° C. a reaction mixture comprising at least one stream of an organic di-or polyisocyanate and a second stream of from about 2 to about 50 parts by weight of a cyclic alkylene carbonate and from about 2 to about 50 parts by weight of a polyether polyol, based on the 100 parts iso-cyanate-carbonate-polyol composition, and a soluble adduct of a tertiary amine and a cyclic alkylene carbonate as catalyst at a concentration of from about 0.01 to about 5.0 weight percent based on the total composition.

2. A method according to claim 1 wherein the cyclic alkylene carbonate is employed in an amount of from about 10 to about 25 parts by weight.

3. A method according to claim 1 wherein the polyether polyol is employed in an amount of from about 10 to about 25 parts by weight.

4. A method according to claim 1 wherein the adduct is employed at a concentration of from about 0.02 to about 0.2 weight percent.

5. A method according to claim 1 wherein the organic di- polyisocyanate is diphenylmethane diisocyanate.

6. A method according to claim 4 wherein the diphenylmethane diisocyanate is carbodiimide modified.

7. A method according to claim 1 wherein the alkylene carbonate is propylene carbonate.

8. A method according to claim 1 wherein the alkylene carbonate is ethylene carbonate.

9. A method according to claim 1 wherein the alkylene carbonate is added along with the di- or polyisocyanate.

10. A method according to claim 1 wherein the soluble adduct is a reaction complex of triethylene diamine and propylene carbonate.

11. A method according to claim 1 wherein the adduct is formed by reacting and aging the tertiary amine and cyclic alkylene carbonate for a time sufficient to form an effective catalytic concentration of the adduct.

12. A method according to claim 1 wherein the streams of the polyisocyanurate formulation are reaction injection molded into glass fiber mats.

* * * * *